Nov. 23, 1926.

J. J. AURYNGER 1,608,472

CONDENSER

Filed Dec. 1, 1922    3 Sheets-Sheet 1

WITNESSES:    John J. Aurynger
                                    INVENTOR.
BY

ATTORNEY.

Nov. 23, 1926.

J. J. AURYNGER 1,608,472

CONDENSER

Filed Dec. 1, 1922

3 Sheets-Sheet 2

WITNESSES:

John J. Aurynger
INVENTOR.

BY

ATTORNEY.

Nov. 23, 1926.

J. J. AURYNGER

CONDENSER

Filed Dec. 1, 1922

1,608,472

3 Sheets-Sheet 3

WITNESSES:

John J. Aurynger
INVENTOR.

BY

ATTORNEY.

Patented Nov. 23, 1926.

1,608,472

UNITED STATES PATENT OFFICE.

JOHN J. AURYNGER, OF BROOKLYN, NEW YORK.

CONDENSER.

Application filed December 1, 1922. Serial No. 604,248.

This invention consists of an additional set of plates and a third terminal to any condenser, any two of which form a condenser.

My invention is characterized by an internal continuous conduction with one set of plates and differs from other inventions which use an external interrupted conduction with two joined sets of plates. In my invention resonance becomes automatic and the reactance in a single set of plates is zero which increases the amplitude of the oscillations. In the external type the conduction between parts of the condenser may be interrupted where resonance is obtained at two points in each of two pairs of condenser plates, and the separate parts joined electrically.

This invention is related to the superposition of electric oscillations from one condenser upon a second condenser in wireless telegraphy and telephony. In the place of a second condenser, this invention has a third electrode which when paired with either of the two terminals of the first condenser form a second condenser.

Any condenser has two plates or more separated by a dielectric and connected to either of two terminals. A charge on one plate induces through the dielectric an electric charge of opposite sign on the second plate. When a two element condenser is discharged the current is oscillatory which happens when a spark jumps from one terminal to the other and the polarity of the elements change with each discharge. The amplitude of the oscillations decreases in size with each discharge depending on the initial charge on the plate.

When a third set of plates is made a part of a condenser with two other sets of plates, the value of the dielectric between the plates is unchangeable as in the case of the two plate condenser. The induction is increased when oscillations are generated locally. On discharging a condenser that has three sets of plates the oscillations of the third set of plates combine with the oscillations of the two plate condenser. The amplitude of the resulting oscillations will be increased when the oscillations coincide. Amplification of current by the use of a third set of plates is without increase in the resistance which would be the case if two separate condensers were used.

Figure 1:
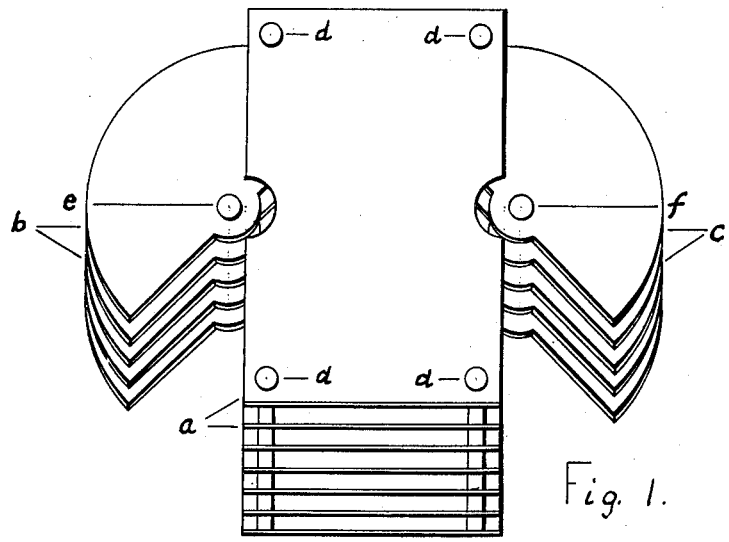
Figures 2, 3:
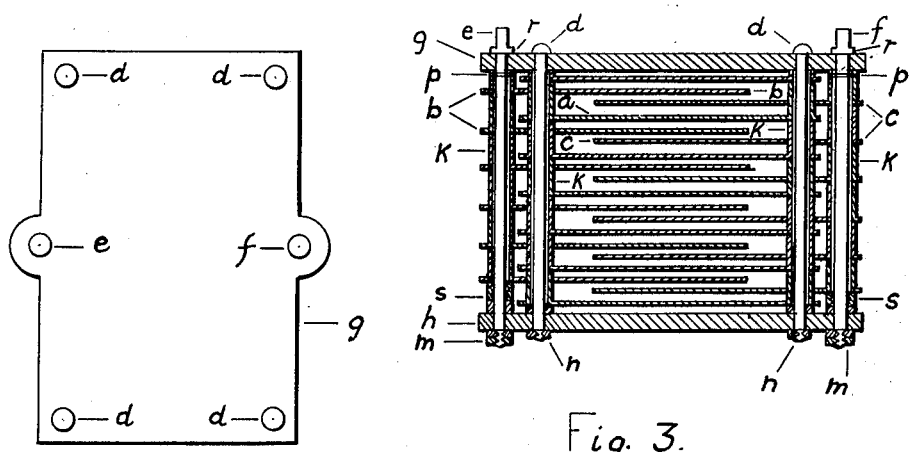
Figure 4:
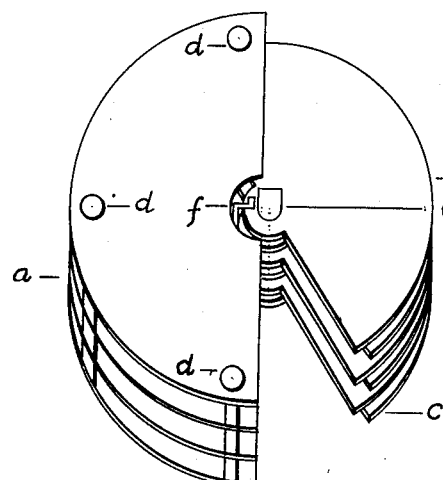
Figure 6:
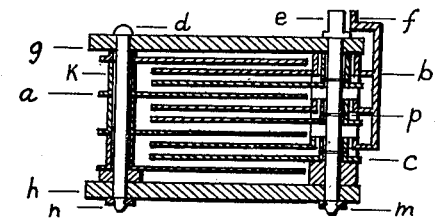
Figure 7:
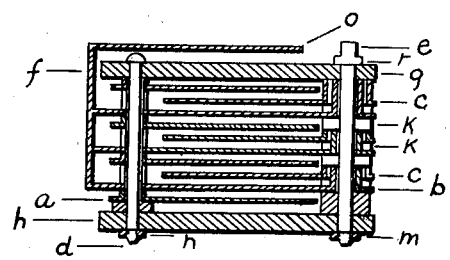
Figure 5:
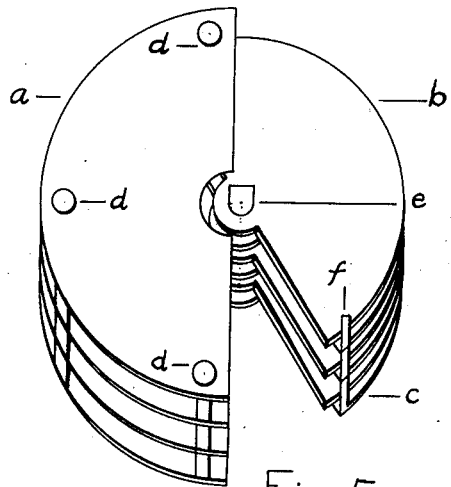
Figure 8:
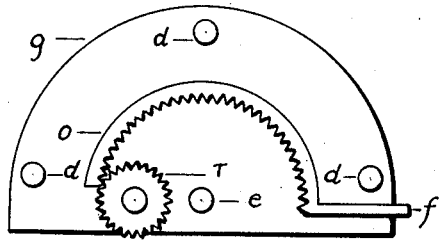
Figure 9:
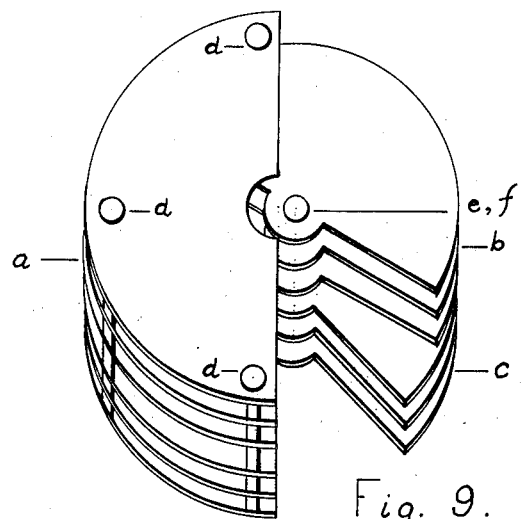
Figure 10:
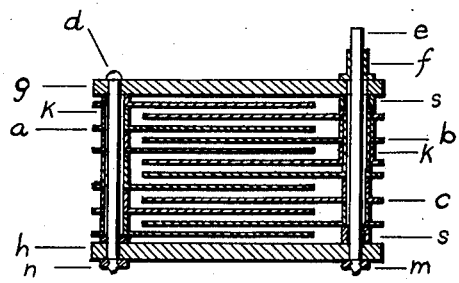
Figure 11:
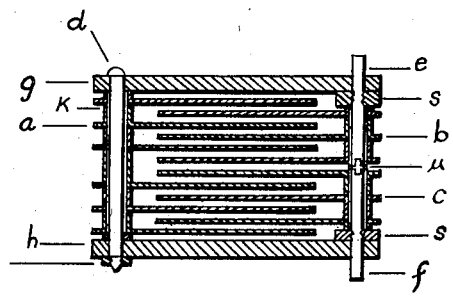

Fig. 1 is a view of the device with the insulating end piece removed and the movable plates in partly open position. Fig. 2 is a plan view of the insulating end piece. Fig. 3 is a transverse section of Fig. 1 with the movable plates in closed position. Fig. 4, a modification of Fig. 1, shows the condenser without the insulating end pieces, the rotary plates parallel and in partly open position. Fig. 6 is a transverse section of Fig. 4 with movable plates in closed position. Fig. 7 is a modification of Fig. 6. Fig. 5 is another modification of Fig. 4 with insulating end pieces removed, the rotary plates being parallel in a partly open position and the single stationary plate series. Fig. 8 represents a plan view of insulating end pieces for condensers designed after Figs. 4, 5, and 9. Fig. 9, another modification of Fig. 1, is a view of the device with insulating end pieces removed, a single set of stationary plates, two sets of parallel rotary plates in partly open position. Fig. 10 is a transverse section of Fig. 9 with rotary plates in closed position. One rotary shaft is telescoped within the other rotary shaft. Fig. 11 is another transverse section of Fig. 9 with rotary plates in closed position. The shaft of one set of rotary plates is in the extended axis of the other rotary set of plates.

In the form shown in Fig. 1, the two rotary sets of plates "e" and "f" are on opposite sides of the stationary set of plates "a". Both the stationary and rotary sets of plates consist of many courses of a nonmagnetic metal as aluminum held together by transverse rods preferably of nonmagnetic metal. Short pieces of metallic tubing slip over these rods and give proper spacing between the plates. The three sets of plates are insulated from each other.

The bolts "d" pass through perforations in plates "a" and hold the stationary plates in assembled form by nuts. The threaded bolts are long enough to allow passage through the insulating covers and nuts to hold covers in place. When the width of the stationary plates is the same as the rotary plates, the two sets of rotary plates overlap and an alternate series of "a", "b" and "c" plates are formed. When the width of the single stationary series is twice the width of the rotary plates the alternate series is limited to a single set of rotary plates with the same stationary plates with the rotary sets of plates laterally placed with respect to a single stationary plate.

The plates are parallel and alternate in triatic order. The plates "b" and "c" rotate horizontally passing through the grooves between the plates of the set of plates next to it. When the rotary plates are clear of the stationary plates the condenser has zero capacity. As the plates disappear between the stationary set of plates the capacity of the condenser is increased.

The end piece "g" is of insulating material as hard rubber or bakelite. It is the upper and lower frames through which passes the studs "d" of the stationary set of plates and the spindles "e" and "f" of the rotary set of plates. The studs and spindles may also be used as terminals.

Fig. 3 is a cross section view of the same. A brass spindle may be threaded at both ends on one end of which "P" nut forms a flange. The spindle may be machined with a flange at one end "p" and threaded at the other. The plates "b" are semi-circular for a variable condenser perforated so that when plate rotates it has circular motion around perforation through which passes stud "e". The plates are equally spaced and held in assembled form by nut "s". Lock nuts "r" and "m" may be placed over the covers "g" and "h".

A second and third set of rotary plates are of similar construction as spindle marked "f" and plates "c".

Into the frame are introduced two end pieces of insulating material as bakelite or hard rubber, the upper piece marked "g" and the lower piece "h". The studs "d" which pass through both end pieces are rigid with stationary plates and are surmounted by nuts "n". The spindles "e" and "f" rotate through bearings in "g" and "h". By tightening lock nuts "r" and "m" any degree of rotation may be given to the rotary plates.

Figs. 4 and 5 represent the pectinate type of the three plate series condenser, a modification of Fig. 1. The spindles telescope; both rotate about the same axis. One set of rotary plates can make only one-half a revolution in respect to the rotation of the other rotary set of plates. In Fig. 5 the spindle "f" is removed from the center of rotation and is represented by a metal strip fastened to "C" plates at one corner. Plates "c" rotate around the spindle "e" and are insulated from the spindle by a small bushing on the plates. In the place of a second spindle there is a metal bar "f" fastened on a projection on the "c" plates which will permit rotation around spindle "e". When the bar "f" is placed near the center of rotation it passes between the stationary plates and the rotary plates. The rotary plates revolve on the same axis about solid spindle "e" and telescoping spindle "f". The plates "b" and "c" form alternate series and are so spaced that in the closed position the alternate series become "a", "b" and "c" respectively.

Fig. 6 is the cross section view of the same. The stationary set of plates "a" and the rotary electrode "e" are the same as described under Fig. 3. The "c" plates do not rotate with spindle "e" to which they are held by a bushing of hard rubber or bakelite. The bushings may be used in place of the metal tubing "k".

The plates are arranged alternately in series of "a", "b" and "c" plates. The rotary plates "b" may be placed in open position so that "c" plates will form an alternate series with stationary plates "a". Also the rotary plates "c" may be in the open position and the stationary plates "a" will form an alternate series with rotary plates "b".

Fig. 7 is a modification of Fig. 6. The rod "f" is joined to plates "c" on a projection at the outer edge of "c". The plates "c" rotate in a semi-circle and are prevented from making a full rotation by the stationary "a" from which the rotary set of plates is insulated. A straight bar "o" is fastened to "f" which in turn may be fastened to a knob which will rotate around the spindle "e". When the size of the rotary plates is decreased, the width of the plates can be made such that the plates do not overlap; the superposed plates become lateral and the distance between the stationary plates can be decreased. In the place of the usual spacing washers which separate the plates, an embossed plate with flanges to equalize the distance between the plates as shown by the drawings may be used.

The rotary plates will operate the same as the two rotary sets with respect to the single stationary set described under Fig. 6.

Fig. 8 shows a top view of the same. The extension "f" is semicircular and lined with teeth at "o" to which is geared wheel "t". The terminal of the third set of plates "t" is shown separate from the spindle "e". By placing wheel "t" over spindle "e" the plates "c" will rotate around "e" by external connections.

Fig. 9 represents the columnar type of condenser having three sets of plates also a modification of Fig. 1. The stationary set of plates has been described under Fig. 3. The plates of the rotary set of plates alternate separately with the plates of the stationary set of plates. The plates "b" occupy the upper half of the condenser and the plates "c" occupy the lower half of the condenser.

When the set of plates "b" is in open position the set of plates "c" will form an alternate series with the single stationary set of plates "a" and when the "c" set of plates is in the open position the "b" set of rotary plates will form an alternate series with a single stationary set of plates "a".

Fig. 10 represents a cross section view of the condenser. The spindle "f" passes through and beyond spindle "e" which is hollow and at the lower end of "f" are fastened the plates and spacers as previously described by nut "s". A flange on the spindles "e" and "f" mark the beginning of the plates. The spindles are insulated from each other by spacers similar to "k" made of hard rubber or bakelite.

In this position the capacities formed in the two sets of rotary plates "b" and "c" are banked in separate series which do not alternate their plates. When "c" set of plates are in the open position the stationary plates opposite the "c" plates become loose ends of the lower portion of the stationary set of plates "a" which alternate with "b" set of plates in the closed position. The same condition will exist when "c" set of rotary plates is in the closed position and "b" set of rotary plates is in the open position.

Fig. 11 is a modification of Fig. 10. The terminals are separate and are on opposite sides of the condenser. The axis of rotation for the two sets of plates is the same. The spindles do not meet but are held in place and insulated by a fillet joint "u" of hard rubber or bakelite. The two rotary sets of plates occupying opposite sides of the condenser are similar and their construction is similar to "e" in Fig. 10.

The rotary plates will operate with the single stationary set of plates as described under Fig. 10.

This invention is not limited to variable condensers but applies also to fixed condensers. The size and shape of the plates are not specific.

The chief advantages of this invention are the amplification of radio signals and the combination of two condensers into one.

I claim:

1. An electrical condenser having a plurality of parallel metallic plate elements each insulated from the others and arranged to form a plurality of separate capacities through the same area of a dielectric medium, said capacities superimposed upon one of said elements and means for holding said plate elements in assembled order.

2. An electrical condenser having a plurality of parallel metallic plate elements each insulated from the others and arranged to form a plurality of separate capacities through the same area of a dielectric medium, said capacities superimposed upon one of said plate elements, one of said elements stationary, others of said elements rotating for associating separately with said stationary element, each of said rotary elements having a separate axis of rotation and laterally spaced apart in juxtaposition with each other, and means for holding said elements in assembled order.

3. An electrical condenser having a plurality of parallel metallic plate elements, each insulated from the others and arranged to form a plurality of separate capacities through different lateral sections of the same area of a dielectric medium, said capacities superimposed upon one of said plate elements, one of said elements stationary, others of said elements rotating for associating separately with said stationary element, each of said rotary elements having a single axis of rotation and laterally spaced apart in juxtaposition with each other and means for holding said elements in assembled order.

4. An electrical condenser having a plurality of parallel metallic plate elements, each insulated from the others and arranged to form a plurality of separate capacities through the same area of a dielectric medium, said capacities superimposed upon one of said elements, one of said plate elements stationary, others of said elements rotating for associating separately with said stationary element, each of said rotary elements having a separate axis of rotation and laterally spaced apart in alternate series with each other and means for holding said elements in assembled order.

5. An electrical condenser having a plurality of parallel metallic plate elements, each insulated from the others and arranged to form a plurality of separate capacities through different longitudinal sections of the same area of a dielectric medium, one of said plate elements stationary, others of said elements rotating for associating separately with said stationary element, said rotary elements secured in longitudinal sections upon a shaft having the same axis of rotation and means for holding said elements in assembled order.

6. An electrical condenser having a plurality of parallel metallic plate elements, each insulated from the others and arranged to form a plurality of separate capacities through different longitudinal sections of the same area of a dielectric medium, said capacities superimposed upon one of said plate elements, one of said plate elements stationary, others of said elements rotating for associating separately with said stationary element, said rotary elements secured on separate rotor shafts in longitudinal sections on the same axis of rotation, one of said shafts hollow, the other of said shafts passing through said hollow shaft and means for holding said elements in assembled order.

7. An electrical condenser having a plurality of parallel metallic plate elements, each insulated from the others and arranged to form a plurality of separate capacities through the same area of a dielectric medium, said capacities superimposed on one of said elements, one of said plate elements stationary, others of said elements rotating for associating separately with said stationary element, laterally spaced apart on separate axes of rotation, a rack and pinion drive for rotating said rotor elements and including a substantially semi-circular rack secured to the rotor elements and extending concentrically of its axis of rotation and the axis of rotation of the pinion being parallel to and laterally spaced from the axis of rotation of the rotor plate elements.

JOHN J. AURYNGER.